US012738134B2

(12) United States Patent
Bacco

(10) Patent No.: US 12,738,134 B2
(45) Date of Patent: Sep. 15, 2026

(54) NAVIGABLE 3D VIEW OF A PREMISES ALARM EVENT

(71) Applicant: The ADT Security Corporation, Boca Raton, FL (US)

(72) Inventor: Edward Bacco, Lopez Island, WA (US)

(73) Assignee: The ADT Security Corporation, Boca Raton, FL (US)

( * ) Notice: Subject to any disclaimer, the term of this patent is extended or adjusted under 35 U.S.C. 154(b) by 60 days.

(21) Appl. No.: 19/005,647

(22) Filed: Dec. 30, 2024

(65) Prior Publication Data

US 2025/0140092 A1 May 1, 2025

Related U.S. Application Data

(63) Continuation of application No. 17/974,103, filed on Oct. 26, 2022, now Pat. No. 12,211,360.

(60) Provisional application No. 63/293,965, filed on Dec. 27, 2021.

(51) Int. Cl.
*G08B 13/19* (2006.01)
*G06T 19/00* (2011.01)
*G08B 13/196* (2006.01)

(52) U.S. Cl.
CPC ...... *G08B 13/19682* (2013.01); *G06T 19/006* (2013.01); *G08B 13/19693* (2013.01)

(58) Field of Classification Search
CPC ........ G08B 13/19682; G08B 13/19693; G06T 19/006
USPC ...................................................... 340/568.1
See application file for complete search history.

(56) References Cited

U.S. PATENT DOCUMENTS 9,305,401 B1 * 4/2016 Rudin .................. H04N 13/351
9,672,707 B2 6/2017 Kerzner
10,504,348 B2 12/2019 Kerzner
10,514,264 B2 12/2019 Correnti et al.
10,613,729 B2 4/2020 Cohrt
10,643,443 B2 5/2020 Ardo et al.
10,750,153 B2 8/2020 Sadi et al.
11,416,002 B1 8/2022 Day
11,943,565 B2 * 3/2024 Jørgensen ........ G08B 13/19671
2006/0179463 A1 8/2006 Chisholm et al.
2009/0262206 A1 10/2009 Park
2010/0238286 A1 9/2010 Boghossian et al.
2015/0055929 A1 2/2015 Van Hoff et al.
2016/0234916 A1 * 8/2016 Mans .................. H05B 47/115
2018/0091569 A1 3/2018 Roth
2020/0234492 A1 * 7/2020 Han ........................ F21S 8/085
2022/0301192 A1 * 9/2022 Boardman .............. G06T 7/579

(Continued)

FOREIGN PATENT DOCUMENTS

DE 112021000193 T5 9/2022
WO 2018227098 A1 12/2018

*Primary Examiner* — Omar Casillashernandez
(74) *Attorney, Agent, or Firm* — Weisberg I.P. Law, P.A.

(57) ABSTRACT

A control device for a premises security system is provided. The control device includes processing circuitry configured to receive a plurality of video streams associated with the plurality of image capture devices, stitch together at least a portion of the plurality of video streams to generate a three-dimensional (3D) view, determine an alarm event associated with the premises security system, and overlay at least one virtual object onto the 3D view, where the at least one virtual object indicates the alarm event and data associated with the alarm event.

20 Claims, 4 Drawing Sheets

(56) References Cited

U.S. PATENT DOCUMENTS

| | | | | |
|---|---|---|---|---|
| 2022/0335795 | A1 | 10/2022 | Dice et al. | |
| 2022/0351598 | A1* | 11/2022 | Correnti | G08B 13/1672 |
| 2023/0060551 | A1* | 3/2023 | Khatwa | G08G 5/26 |

* cited by examiner

NAVIGABLE 3D VIEW OF A PREMISES ALARM EVENT

CROSS-REFERENCE TO RELATED PATENT APPLICATION

This application is a Continuation of U.S. application Ser. No. 17/974,103 filed Oct. 26, 2022, entitled "NAVIGABLE 3D VIEW OF A PREMISES ALARM EVENT," which is related to and claims priority to U.S. Provisional Patent Application Ser. No. 63/293,965, filed Dec. 27, 2021, entitled NAVIGABLE 3D VIEW OF A PREMISES ALARM EVENT, the entirety of which is incorporated herein by reference.

TECHNICAL FIELD

This invention relates to a method and system, and in particular to a navigable three-dimensional (3D) view of at least a portion of the premises associated with an alarm event.

BACKGROUND

There are different generations of existing premises security systems that are used for monitoring a premises. That is, First Generation premises security systems generally include remote monitoring where one agent, such as a security guard, at a remote monitoring center views a video stream from a camera that is associated with an alarm and then asks another agent to address the alarm. However, in these first generation systems, it may take five to ten minutes to respond based on the urgency of the event, where most incidents are over in less than two minutes. Therefore, alarm events are sometimes not interrupted by action taken by the agent.

Second Generation premises security systems include an operator who can see and hear through a camera and multiple views. However, second generation premises security systems lack 360 degree actionable intelligence and still require personnel or first responders to be dispatched in order to address an alarm event.

Therefore, existing premises security systems may suffer from inefficiencies.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
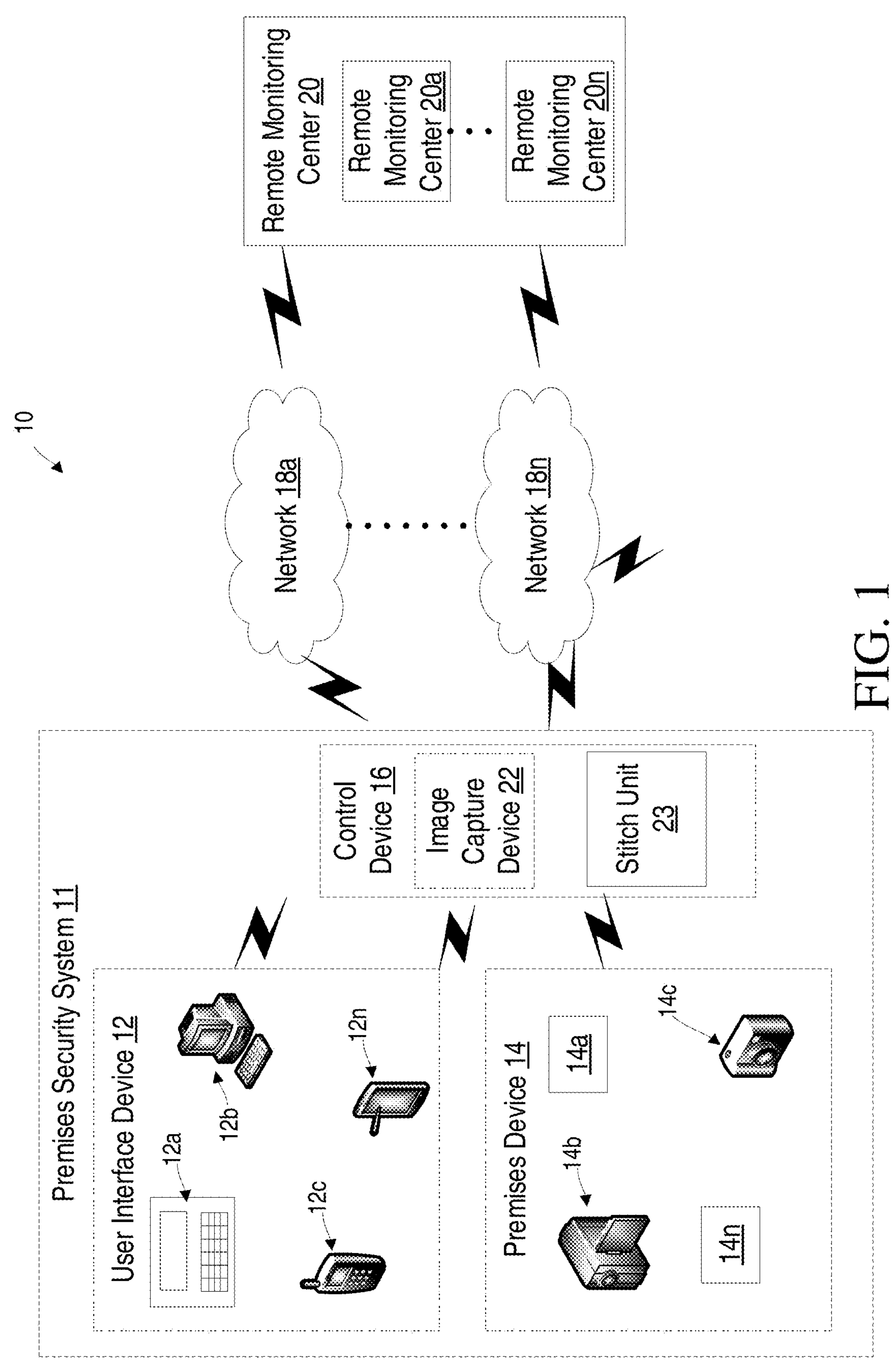
FIG. 1 is a diagram of an example system comprising a premises security system according to principles disclosed herein.

One or more embodiments of the invention are directed to, for example, a monitoring arrangement that provides a virtual presence (3D). That is, a user, such as a guard, agent, operator, etc., is provided with a navigable 3D environment where the complexity of premises devices (e.g., sensors) is hidden by the navigable 3D environment. Put another way, the present invention does not require that the user have knowledge of the locations, configurations, types, or relationships of sensor or premises devices. As used herein, "3D environment" may correspond to one or more of a 3D virtual reality environment, 3D augmented reality environment, etc. Further, the navigable 3D environment may advantageously allow the user to make real time decisions to, for example, address, e.g., respond to, an alarm event, such as by dispatching first responders, clearing or cancelling the alarm event, etc.

Nevertheless, before describing in detail exemplary embodiments, it is noted that the embodiments may reside in combinations of apparatus components and processing steps related to a navigable 3D environment for premises security monitoring. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including," "has" and "having" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 a system designated generally as "10." System 10 may include premises security system 11 where premises security system 11 includes and/or is associated with one or more user interface devices 12*a* to 12*n* (collectively referred to as "user interface device 12"), one or more premises devices 14*a* to 14*n* (collectively referred to as "premises device 14"), and control device 16. System 10 may further include one or more networks 18*a* to 18*n* (collectively referred to as "network 18"), and one or more remote monitoring centers 20*a* to 20*n* (collectively referred to as "remote monitoring center 20"), communicating with each other or with at least one other entity in system 10.

User interface device 12 may be a device, such as a wired or wireless device, which allows a user to communicate with control device 16. User interface device 12 may be a portable control keypad/interface 12*a*, computer 12*b*, mobile phone 12*c* and tablet 12*n*, among other devices that allow a user to interface with control device 16 and/or one or more premises devices 14. User interface device 12 may communicate at least with control device 16 using one or more wired and/or wireless communication protocols well known to those of ordinary skill in the art. For example, portable control keypad 12*a* may communicate with control device 16 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols.

Premises devices 14 may include one or more types of sensors, control and/or image capture devices. For example, a single premises device 14 may include multiple image capture devices (e.g., several digital camera devices pointed at different angles, generating multiple respective video/image/audio streams, contained within a single premises device 14). For example, the types of sensors may include various safety related sensors such as motion sensors, fire sensors, carbon monoxide sensors, flooding sensors and contact sensors, among other sensor types. The control devices 16 may include, for example, one or more lifestyle (e.g., home automation) related devices configured to adjust at least one premises setting, such as lighting, temperature, energy usage, door lock and power settings, among other settings associated with the premises or devices on the premises. Image capture devices may include a digital camera and/or video camera, among other image captures devices. Premises device 14 may communicate with control device 16 via proprietary wireless communication protocols including but not limited to a protocol compliant with the Wi-Fi family of protocols. Various additional sensors and control and/or image capture devices may relate to life safety or lifestyle depending on both what the sensors, control and image capture devices do and how these sensors, control and image devices are used by system 10.

Control device 16 may provide one or more of management functions, image/video stitching functions, image/video analysis functions, control functions such as power management, premises device management and alarm management/analysis, among other functions to premises security system 11. In particular, control device 16 may manage one or more life safety and lifestyle features. Life safety features may correspond to security system functions and settings associated with premises conditions that may result in life threatening harm to a person such as carbon monoxide detection and intrusion detection. Lifestyle features may correspond to functions and settings associated with video capturing devices and non-life-threatening conditions of the premises, such as lighting and thermostat functions. In one or more embodiments, control device 16 may include one or more image capture devices 22, as described herein. Control device 16 includes stitch unit 23 that is configured to generate a 3D environment or rendering. For example, stitch unit 23 is configured to stitch a plurality of video streams captured from a plurality of image capture devices 22, e.g., cameras, to generate a 3D rendering of at least a portion of the premises monitored by premises security system 11. The 3D rendering may be transmitted to the remote monitoring center 20 and/or other entity in system 10 for further analysis. Although FIG. 1 illustrates the stitch unit 23 being contained within the premises security system 11, in some embodiments, some or all of the functionality of the stitch unit 23 may be performed by or with the assistance of one or more computing devices located in one or more remote monitoring centers. Additionally, in some embodiments, some of all of the functionality of the stitch unit 23 may be performed in a distributed computing environment that is in communication with the premises security system 11. Such a distributed computing environment may be a third-party distributed computing environment that provides scalable computing resources for the premises security system 11, the remote monitoring center 20, and/or others.

Control device 16 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. Ethernet communication link may be an IEEE 802.3 or 802.11 based communication link. Network 18 may be a wide area network, local area network, wireless local network and metropolitan area network, among other networks known in the art. Network 18 provides communications between control device 16 and remote monitoring center 20. In one or more embodiments, control device 16 may be part of premises device 14 or user interface device 12. In one or more embodiments, control device 16 and/or stitch unit 23 are part of remote monitoring center 20 or may be network cloud implemented logical devices.

While control device 16 is illustrated as being a separate device from user interface device 12 and premises device 14, in one or more embodiments, control device 16 may be integrated with one or more user interface devices 12 and/or premises devices 14 and/or other entity/device located at premises associated with premises security system 11.

Figure 2:
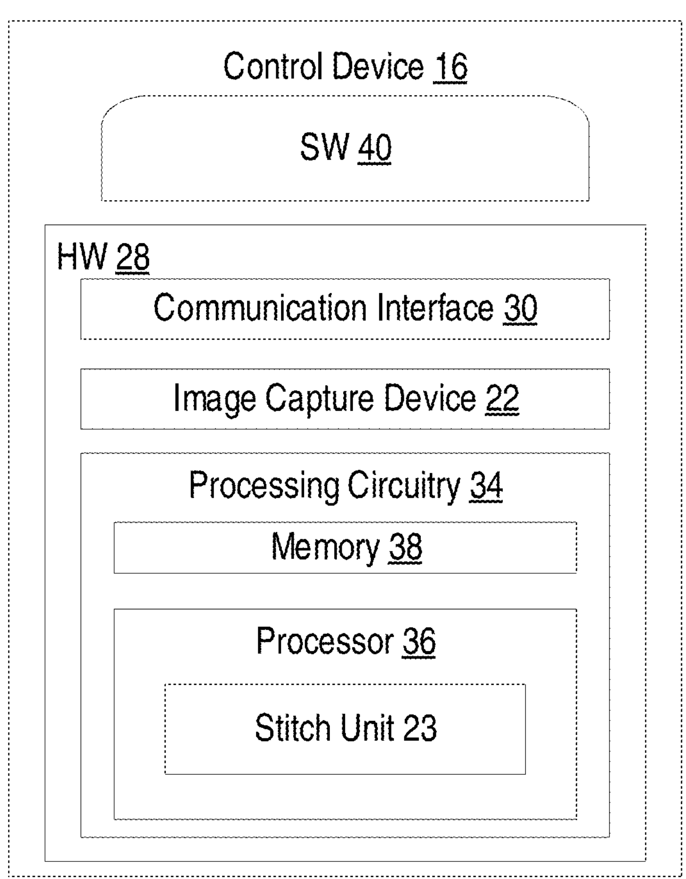
FIG. 2 is a block diagram of some devices in the system according to some embodiments of the present disclosure.

Non-limiting example implementations, in accordance with one or more embodiments, of control device 16 discussed in the preceding paragraphs will now be described with reference to FIG. 2.

The system 10 includes a control device 16 that includes hardware 28 enabling the control device 16 to communicate with one or more entities in system 10 and to perform one or more functions described herein. The hardware 28 may include a communication interface 30 for setting up and maintaining at least a wired and/or wireless connection to one or more entities in system 10 such as remote monitoring center 20, premises device 14, user interface device 12, etc.

In the embodiment shown, the hardware 28 of the control device 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or Field Programmable Gate Arrays (FPGAs) and/or Application Specific Integrated Circuits (ASICs) configured to execute computing instructions.

The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the control device 16 further has software 40 stored internally in, for example, memory 38, or stored in external memory (e.g., database, storage array, network storage device, etc.) accessible by the control device 16 via an external connection. The software 40 may be executable by the processing circuitry 34. The processing circuitry 34 may be configured to control any of the methods and/or processes described herein and/or to cause such methods, and/or processes to be performed, e.g., by control device 16. Processor 36 corresponds to one or more processors 36 for performing control device 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to control device 16. For example, processing circuitry 34 of the control device 16 may include stitch unit 23 which is configured to perform one or more control device 16 functions described herein such as with respect to rendering a navigable three dimensional (3D) view of at least a portion of the premises associated with an alarm event Although FIGS. 1 and 2 show stitch unit 23 as being within a respective processor, it is contemplated that this unit may be implemented such that a portion of the unit is stored in a corresponding memory within the processing circuitry. In other words, the unit may be implemented in hardware or in a combination of hardware and software within the processing circuitry. Further, while control device 16 is described as including a stitch unit 23 for performing, for example, the generation of a 3D environment and/or analysis of the 3D environment, one or more of these functions may alternatively be performed by a remote server in network 18, remote monitoring center 20, cloud network and/or by another device in communication with premises security system 11 via network 18.

Figure 3:
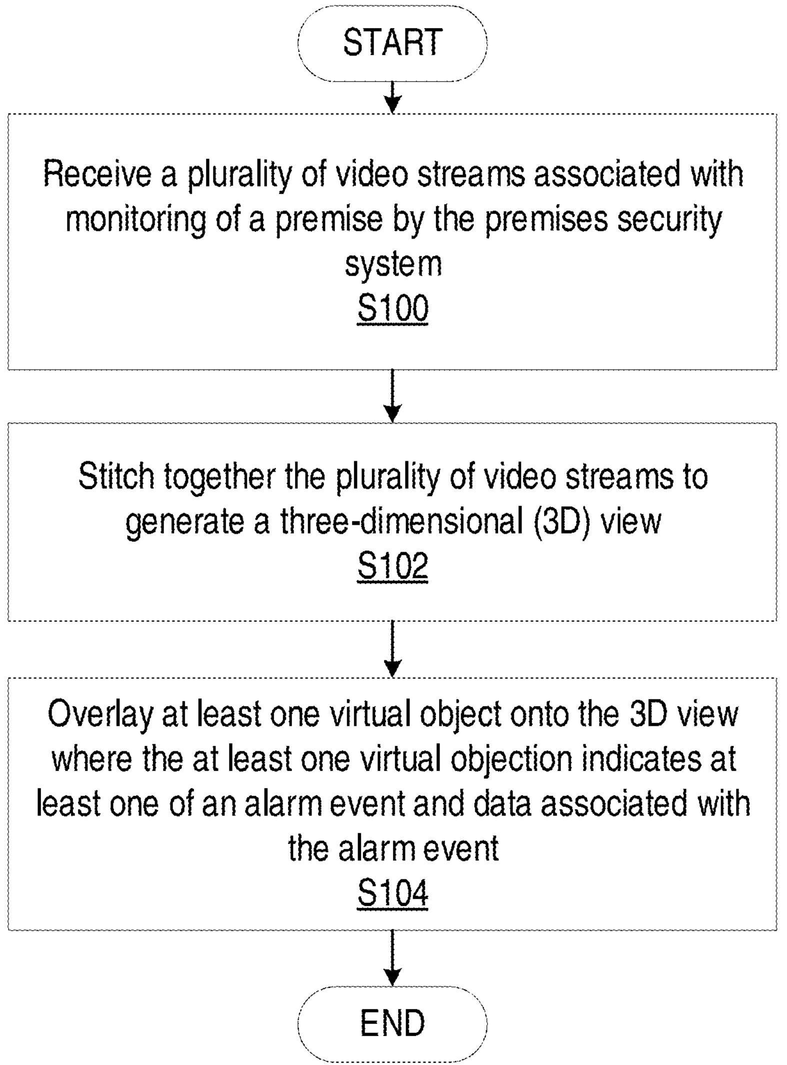
FIG. 3 is a flowchart of an example process in control device according to some embodiments of the present disclosure.

FIG. 3 is a flowchart of an example process in a control device 16 according to one or more embodiments of the present disclosure. One or more blocks described herein may be performed by one or more elements of control device 16 such as by one or more of processing circuitry 34 (including the stitch unit 23), processor 36, etc. Control device 16 is configured to receive (Block S100) a plurality of video streams associated with monitoring of a premise by the premises security system, as described herein. Control device 16 is configured to stitch (Block S102) together the plurality of video streams to generate a three-dimensional (3D) rendering, as described herein. Control device 16 is configured to overlay (Block S104) at least one virtual object onto the 3D rendering where the at least one virtual object indicates at least one of an alarm event or data associated with the alarm event.

According to one or more embodiments, in response to an alarm event, control device 16 generates a 3D rendering of an area associated with the alarm event, i.e., alarm area, such as to automatically provide the user with a 3D view of the alarm area, i.e., display a 3D view of the alarm area. Further, in one or more embodiments, an orientation of the 3D view may be based at least in part on the location of the alarm event (e.g., specific position of the alarm) within the premises. For example, the 3D view may be oriented toward a door/window or behind a chair if motion and/or video sensors are triggered at one or more of these specific locations. In other words, in one or more embodiments, sensor information (e.g., triggered sensor, untriggered sensor, sensor values, etc.) may be considered when generating the 3D view.

According to one or more embodiments, the plurality of video streams may be stitched together based at least in part on at least one of temporal characteristics associated with each video stream or spatial characteristics associated with each video stream. For example, the temporal characteristics (e.g., time stamps) of one or more images in a video stream are used to stitch (e.g., associate) images having the same or similar time stamps together. Further, in one example, spatial characteristics (e.g., positioning data relative to another object in premises security system 11 and/or a fixed position in the control device 16 (or device including the image capture device 22)). That is, the spatial characteristics may be used to associate one or more images in a video stream with other images in at least one other video stream where the associated images represent physically adjacent or overlap areas of the premises.

According to one or more embodiments, the spatial characteristics associated with each video stream are based on a positioning of a respective image capture device 22 relative to at least one of the other image capture devices 22, the spatial characteristics being dynamically modifiable by a user. For example, a network entity operated by a user (e.g., a user at a remote monitoring center 20) may transmit one or more instructions to control device 16 and/or device including image capture device 22 to re-orient the image capture device 22 and/or cause the device to move. In other words, the movement/orientation of image capture device 22 may be remotely controllable by one or more entities in system 10. In one or more embodiments, one or more image capture devices 22 may be fixed or stationary cameras equipment with lenses, such as fish-eye lenses, in which the captured image can be digitally manipulated to allow viewing and/or stitching of portions of the captured images.

According to one or more embodiments, the processing circuitry 34 may be further configured to analyze at least one of the plurality of video streams for a predefined landmark object, where the 3D view includes an indication of the predefined landmark object. For example, processing circuitry 34 may analyze one or more images or one or more video streams in order to determine whether a predefined landmark is present. The predefined landmark may, for example, correspond to one or more of a reception desk, television, framed picture, etc. By indicating one or more predefined landmarks in the 3D view, the 3D view is able to provide information, such as overlay information in the 3D view, that facilitates users becoming oriented in the 3D view and/or more quickly determine the location of an alarm.

According to one or more embodiments, the processing circuitry 34 is further configured to cause transmission of the 3D rendering to at least one of a remote monitoring center 20, a wearable device or a wireless device for display. In other words, the remote monitoring center 20 receives the stitched together video streams and is able to navigate the 3D rendering in order to quickly assess the alarm event.

According to one or more embodiments, each video stream of the plurality of video streams is associated with a respective one of a plurality of premises devices 14. For example, one or more premises devices 14 includes a respective image capture device 22 where control device 16 receives the video stream from the premises devices 14.

According to one or more embodiments, one of the plurality of premises devices 14 is a mobile premises device 14 that is mobile within the premises where the processing circuitry 34 of the control device 16 is further configured to determine a first area in the premises that is not illustrated in the 3D view, and cause one or more of the mobile premises device 14 to relocate so that the first area is within the field of view of one or more of the mobile premises devices 14. For example, premises device 14 and/or image capture device 22 may be a motorized and/or mobile device that is able to traverse the premises where the mobile device is controllable by remote monitoring center 20 and/or another entity in system 10.

According to one or more embodiments, the processing circuitry 34 of the control device 16 is further configured to determine a portion of the 3D view is in a low light condition, and cause at least one device capable of providing additional light to activate where the at least one device is proximate an area in the premises corresponding to the portion of the 3D view, and where the at least one device corresponds to at least one of a lighting fixture and television. For example, processing circuitry 34 may determine that at least one image in the video stream is in a low light condition such that processing circuitry 34 is configured to cause at least one light generating device in the premises to turn on in order to help provide better lighting for at least one video stream.

According to one or more embodiments, the control device 16 operates in connection with a remote monitoring center 20 and premises security system 11. For example, the stitch unit may be located at remote monitoring center 20 such that remote monitoring center 20 receives the video streams for generating the 3D rendering. In another example, control device 16 or another component in premise security system 11 includes stitch unit 23 where the control device 16 or component receives the video streams for generating the 3D view.

According to one or more embodiments, the 3D rendering may be updated based on additionally and/or newly triggered sensors such that additional alarm event(s) may be indicated and/or overlayed onto the 3D view after the first alarm event that triggered the generation of the 3D view.

Figure 4:
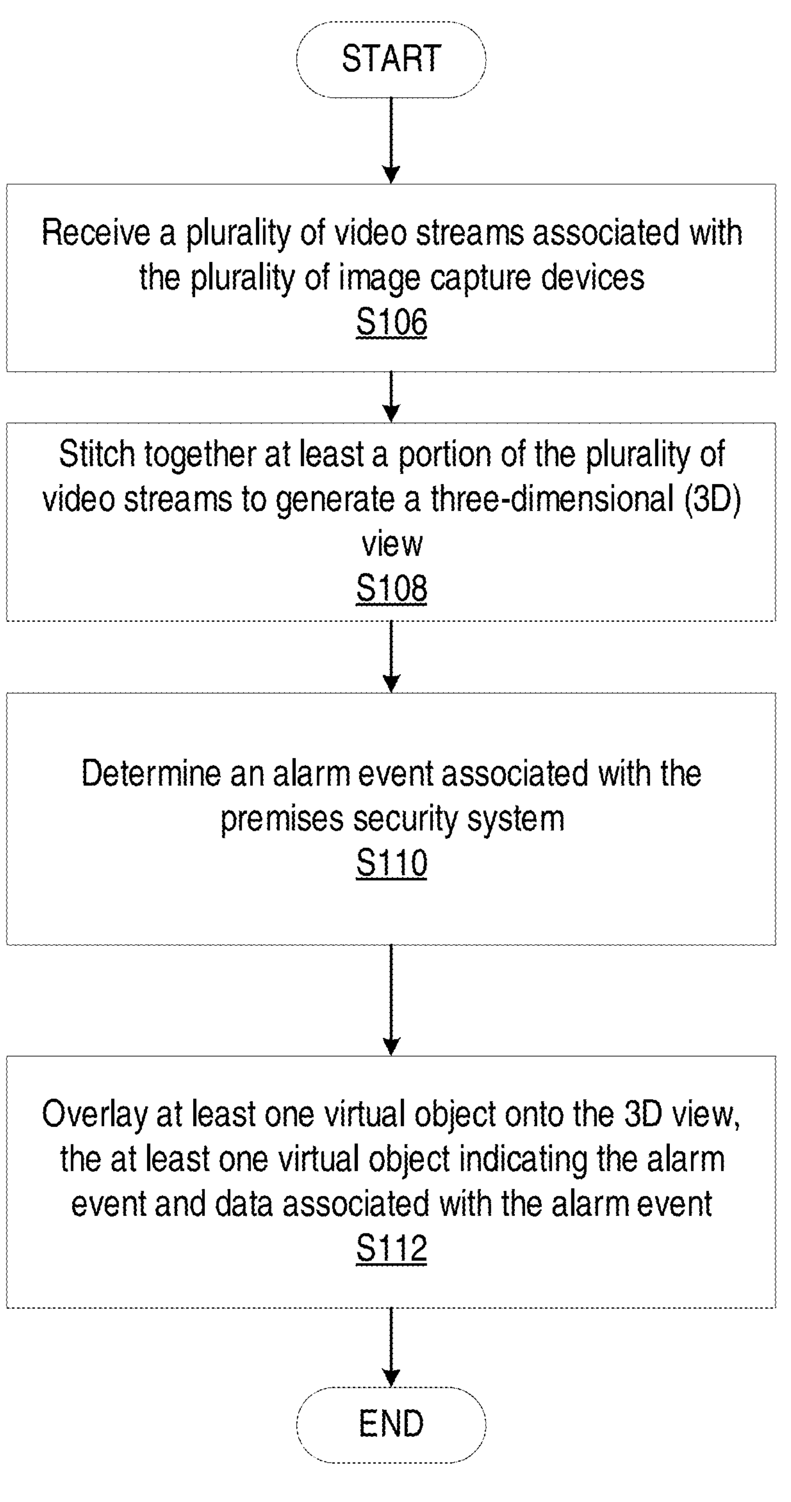
FIG. 4 is a flowchart of another example process in control device according to some embodiments of the present disclosure.

FIG. 4 is a flowchart of an example process in a control device 16 according to one or more embodiments of the present invention. One or more blocks described herein may be performed by one or more elements of control device 16 such as by one or more of processing circuitry 34 (including the stitch unit 23), processor 36, etc. Control device 16 is configured to receive (Block S106) a plurality of video streams associated with the plurality of image capture devices 22. Control device 16 is configured to stitch (Block S108) together at least a portion of the plurality of video streams to generate a three-dimensional (3D) view. Control device 16 is configured to determine (Block S110) an alarm event associated with the premises security system 11. Control device 16 is configured to overlay (Block S112) at least one virtual object onto the 3D view, where the at least one virtual object indicates the alarm event and data associated with the alarm event.

According to one or more embodiments, the plurality of video streams are stitched together based at least in part on at least one of a plurality of temporal characteristics associated with at least one video stream of the plurality of video stream, or a plurality of spatial characteristics associated with at least one video stream of the plurality of video streams. According to one or more embodiments, the plurality of spatial characteristics associated with the at least one video stream are based at least in part on a positioning of a first one of the plurality of image capture devices 22 relative to at least one of the plurality of other image capture devices 22.

According to one or more embodiments, the control device 16 is further configured to determine a predefined landmark object is present in at least one of the plurality of video streams, overlay an indication of the predefined landmark object onto the 3D view. According to one or more embodiments, the control device 16 is further configured to cause transmission of the 3D view to at least one of a remote monitoring center 20, a wearable device, or a wireless device for display.

According to one or more embodiments, the premises security system 11 includes a mobile premises device 14 that is mobile within the premises, and the control device 16 is further configured to determine a first area in the premises that is not illustrated in the 3D view, and to cause the mobile premises device 14 to relocate so that the first area is within a field of view of an image capture device 22. According to one or more embodiments, the control device 16 is further configured to determine a portion of the 3D view indicates a low light condition, and cause at least one premises device 14 to illuminate an area in the premises corresponding to the portion of the 3D view.

According to one or more embodiments, the control device 16 is part of one of a remote monitoring center 20 or the premises security system 11. According to one or more embodiments, the 3D view is at least one of an augmented reality view, a virtual reality view, and a two-dimensional projection of a digital 3D environment. According to one or more embodiments, the control device 16 is further configured to determine an orientation of the 3D view based at least in part on a location of the alarm event within the premises, and sensor information associated with at least one sensor that triggered the alarm event.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support Embodiments to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A control device for a premises security system including a plurality of image capture devices, the control device comprising:
- processing circuitry configured to:
  - receive a plurality of video streams associated with the plurality of image capture devices;
  - stitch together at least a portion of the plurality of video streams to generate a three-dimensional (3D) view;
  - determine an alarm event associated with the premises security system;
  - overlay at least one virtual object onto the 3D view, the at least one virtual object indicating the alarm event and data associated with the alarm event;
  - determine that a first portion of the 3D view fails to meet a predefined lighting condition;
  - activate at least one light generating device at the premises and proximate a location corresponding to the first portion of the 3D view, the activation of the at least one light generating device being configured to provide light to the location, the light generating device being different from the plurality of image capture devices; and
  - after the activation of at least one light generating device at the premises, regenerate at least a portion of the 3D view.

2. The control device of claim 1, wherein the plurality of video streams are stitched together based at least in part on at least one of:
- a plurality of temporal characteristics associated with at least one video stream of the plurality of video streams; or
- a plurality of spatial characteristics associated with at least one video stream of the plurality of video streams.

3. The control device of claim 2, wherein the plurality of spatial characteristics associated with the at least one video stream are based at least in part on a positioning of a first one of the plurality of image capture devices relative to at least one other one of the plurality of image capture devices.

4. The control device of claim 1, wherein the processing circuitry is further configured to:
- determine a predefined landmark object is present in at least one of the plurality of video streams; and
- overlay an indication of the predefined landmark object onto the 3D view.

5. The control device of claim 1, wherein the processing circuitry is further configured to cause transmission of the 3D view to at least one of a remote monitoring center, a wearable device, or a wireless device for display.

6. The control device of claim 1, wherein the processing circuitry is further configured to:
- determine a first area in the premises that is not illustrated in the 3D view; and
- cause a mobile premises device that is mobile within the premises to relocate so that the first area is within a field of view of an image capture device.

7. The control device of claim 1, wherein the light generating device is one of a lighting fixture or television at the premises.

8. The control device of claim 1, wherein the control device is part of one of a remote monitoring center or the premises security system.

9. The control device of claim 1, wherein the 3D view is at least one of:
- an augmented reality view;

a virtual reality view; or a two-dimensional projection of a digital 3D environment.

10. The control device of claim 1, wherein the processing circuitry is further configured to determine an orientation of the 3D view based at least in part on:

a location of the alarm event within the premises; and sensor information associated with at least one sensor that triggered the alarm event.

11. A method implemented by a control device for a premises security system, the premises security system including a plurality of image capture devices, the method comprising:

receiving a plurality of video streams associated with the plurality of image capture devices;

stitching together at least a portion of the plurality of video streams to generate a three-dimensional (3D) view;

determining an alarm event associated with the premises security system;

overlaying at least one virtual object onto the 3D view, the at least one virtual object indicating the alarm event and data associated with the alarm event;

determining that a first portion of the 3D view fails to meet a predefined lighting condition;

activating at least one light generating device at the premises and proximate a location corresponding to the first portion of the 3D view, the activation of the at least one light generating device being configured to provide light to the location, the light generating device being different from the plurality of image capture devices; and after the activation of at least one light generating device at the premises, regenerating at least a portion of the 3D view.

12. The method of claim 11, wherein the plurality of video streams are stitched together based at least in part on at least one of:

a plurality of temporal characteristics associated with at least one video stream of the plurality of video streams; or a plurality of spatial characteristics associated with at least one video stream of the plurality of video streams.

13. The method of claim 12, wherein the plurality of spatial characteristics associated with the at least one video stream are based at least in part on a positioning of a first one of the plurality of image capture devices relative to at least one other one of the plurality of image capture devices.

14. The method of claim 11, further comprising:

determining a predefined landmark object is present in at least one of the plurality of video streams; and overlaying an indication of the predefined landmark object onto the 3D view.

15. The method of claim 11, further comprising causing transmission of the 3D view to at least one of a remote monitoring center, a wearable device, or a wireless device for display.

16. The method of claim 11, further comprising:

determining a first area in the premises that is not illustrated in the 3D view; and causing a mobile premises device that is mobile within the premises to relocate so that the first area is within a field of view of an image capture device.

17. The method of claim 11, wherein the light generating device is one of a lighting fixture or television at the premises.

18. The method of claim 11, wherein the control device is part of one of a remote monitoring center or the premises security system.

19. The method of claim 11, wherein the 3D view is at least one of:

an augmented reality view;

a virtual reality view; or a two-dimensional projection of a digital 3D environment.

20. The method of claim 11, further comprising determining an orientation of the 3D view based at least in part on:

a location of the alarm event within the premises; and sensor information associated with at least one sensor that triggered the alarm event.

* * * * *